United States Patent [19]

Nakajima et al.

[11] Patent Number: 5,684,604
[45] Date of Patent: Nov. 4, 1997

[54] IMAGE TRANSMISSION METHOD AND APPARATUS THEREFOR

[75] Inventors: Toshifumi Nakajima, Tokyo; Fumio Shoji, Yokohama, both of Japan

[73] Assignee: Canon Kabushiki Kaisha, Tokyo, Japan

[21] Appl. No.: 441,667

[22] Filed: May 15, 1995

Related U.S. Application Data

[63] Continuation of Ser. No. 51,361, Apr. 23, 1993.

[30] Foreign Application Priority Data

| Apr. 28, 1992 | [JP] | Japan | 4-110067 |
| Jun. 8, 1992 | [JP] | Japan | 4-147727 |
| Sep. 16, 1992 | [JP] | Japan | 4-246249 |

[51] Int. Cl.$^6$ ............................................. H04N 1/00
[52] U.S. Cl. .................. 358/434; 358/439; 358/404; 358/426; 358/444
[58] Field of Search ........................ 358/400, 401, 358/403, 404, 426, 427, 261.1, 261.2, 261.3, 261.4, 432, 433, 434, 435, 436, 438, 439, 296; 395/110–115; 364/551.01

[56] References Cited

U.S. PATENT DOCUMENTS

| 4,261,018 | 4/1981 | Knowlton | 358/470 |
| 4,862,282 | 8/1989 | Nakajima | 358/400 |
| 5,018,080 | 5/1991 | Inoue | 358/401 |
| 5,073,827 | 12/1991 | Nakajima | 358/437 |
| 5,121,221 | 6/1992 | Hamano et al. | 358/426 |
| 5,208,681 | 5/1993 | Yoshida | 358/439 |
| 5,249,066 | 9/1993 | Fukuda et al. | 358/433 |
| 5,272,543 | 12/1993 | Yanagisawa | 358/426 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

Efficient image transmission is performed upon determining, based upon information sent from a receiving side at the time of negotiation, whether the apparatus on the receiving side is capable of progressive build-up, pseudo-progressive build-up in stripe units, sequential build-up or more than one of these build-up methods. Examples of the information sent from the receiving side include an instruction entered on the receiving side, the type of printer, the stripe width if the printer is capable of stripe printing, the communication speed and the memory capacity, etc. It is possible to use information from a line or network as well. This arrangement makes it possible to transmit image data that has been coded efficiently. Outstanding effects are obtained in multiple-address communication.

22 Claims, 17 Drawing Sheets

NUMERALS REPRESENT RESOLUTION (pel/inch)
C: CODING, D: DECODING, R: RESOLUTION (REDUCTION),
E: RESOLUTION (ENLARGEMENT)

FIG. 4

| MSB | | | | | | | LSB |
|---|---|---|---|---|---|---|---|
| DL : initial layer to be transmitted ||||||||
| D : number of differential layers ||||||||
| P : number of bit-planes ||||||||
| Xd : horizontal image size at layer d ||||||||
| Xd    same as above ||||||||
| Xd    same as above ||||||||
| Xd    same as above ||||||||
| Yd : vertial image size at layer d ||||||||
| Yd    same as above ||||||||
| Yd    same as above ||||||||
| Yd    same as above ||||||||
| Lo : lines per stripe at lowest resolution ||||||||
| Mx : max horizontal offset allowed for AT pixel ||||||||
| My : max vertical offset allowed for AT pixel ||||||||
| - - - - | - - - - | - - - - | - - - - | HITOLO | SEQ | ILEAVE | SMID |
| - - - - | LRLTWO | VLENGT | TPDON | TPBON | DPON | DPPRIV | DPLAST |

- - - : Reserved
HITOLO : high to low
SEQ : sequential
ILEAVE : interleave multiple bit-planes
SMID : index over strip is in middle LRLTWO : lowest-resolution 2-line template
VLENGTH : variable length
DPDON : differential-layer TP ended
DPBON : lowest-resolution-layer TP ended
DPON : DP ended
DPPRIV : DP private
DPLAST : DP last

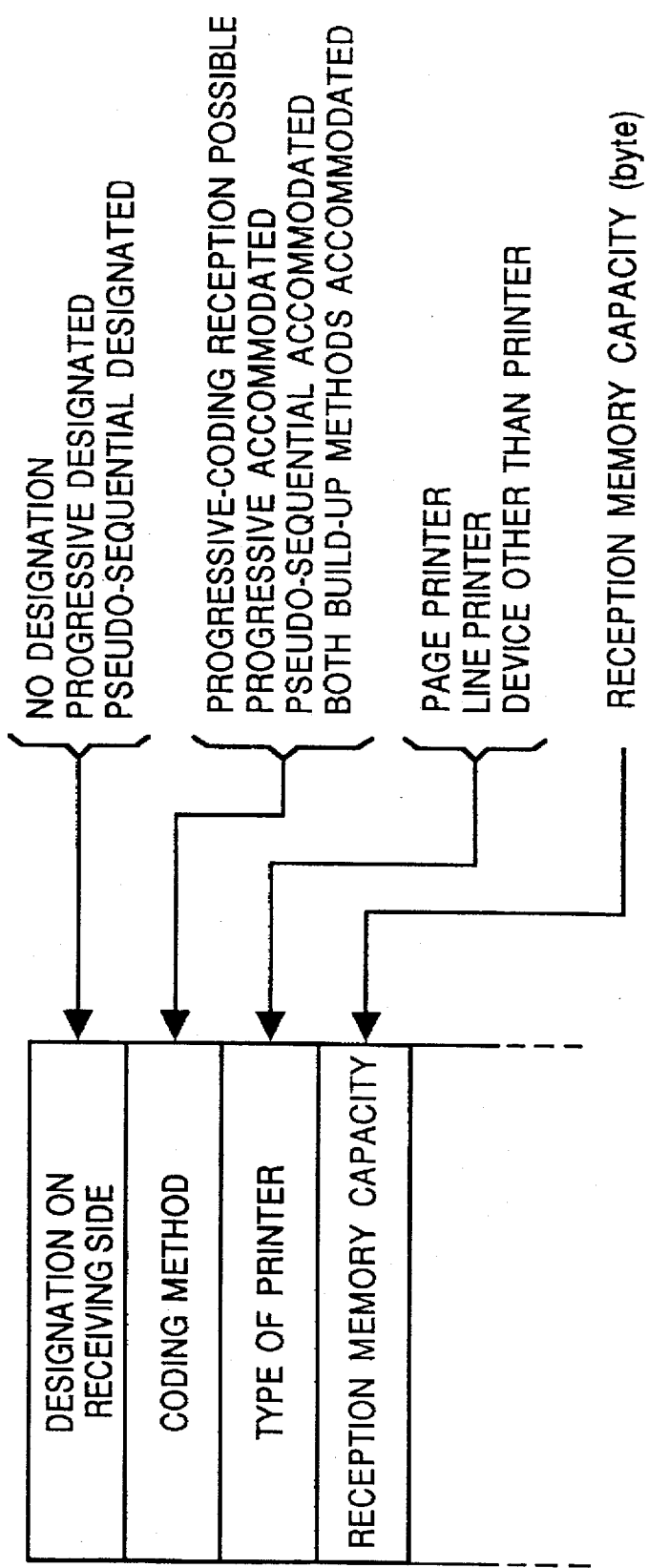

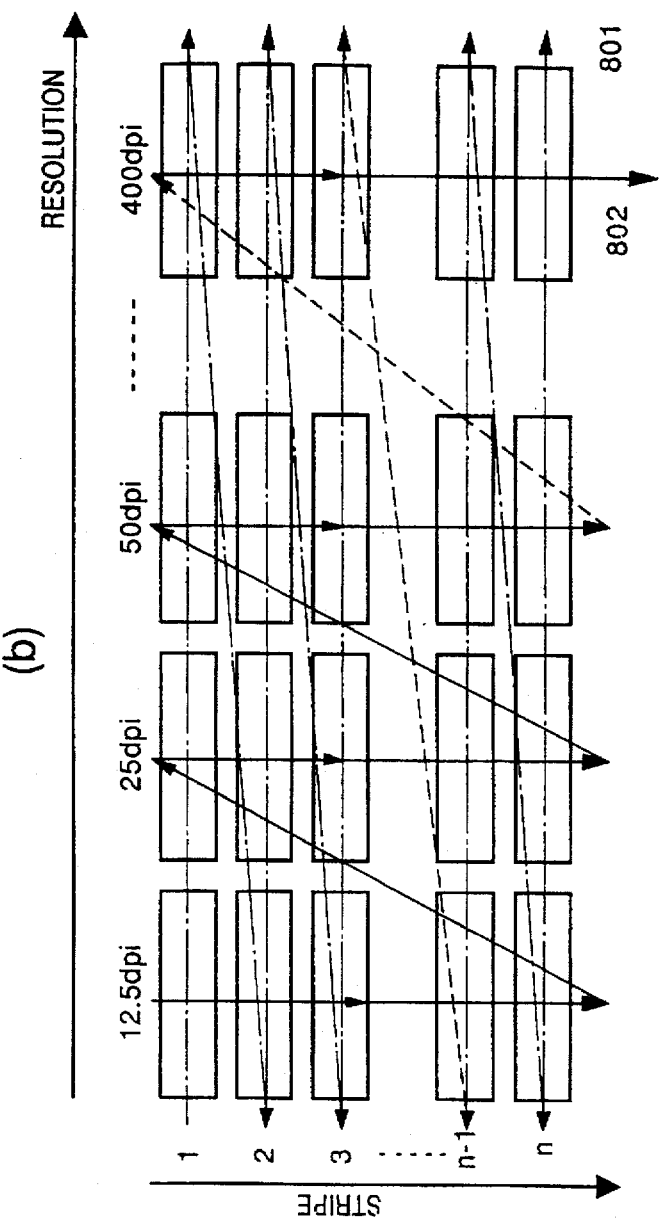
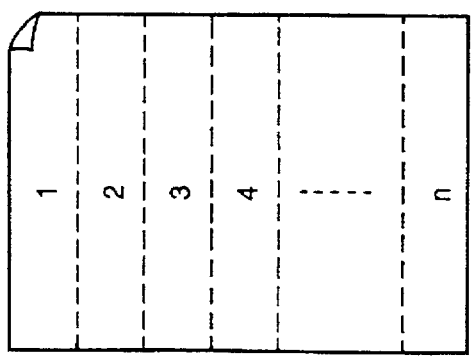
FIG. 6
PRIOR ART

IMAGE TRANSMISSION METHOD AND APPARATUS THEREFOR

This application is a continuation, of application Ser. No. 08/051,361 Apr. 23, 1993.

BACKGROUND OF THE INVENTION

1. Field of the Invention

This invention relates to a method and apparatus for transmitting an image, such as an image transmission method for transmitting image information upon subjecting the information to progressive coding, and an image transmission apparatus such as a facsimile machine for performing such transmission.

2. Description of the Related Art

Standard methods of coding in a facsimile machine include MH, MR and MMR. With these coding methods, however, the image of an original is transmitted sequentially from top to bottom. Consequently, these methods are not suited to new image communication formats, such as an image data-base service, in which sequential transmission is not essential. The reason for this is that the image service speed would be too slow.

A transmission method that has been proposed to cope with new image communication formats is progressive build-up, in which a rough, full image is displayed at an early stage, after which the image is gradually improved in picture quality. If this method is employed, the user is capable of comprehending the content of an image early on, and an improvement in retrieval efficiency can be achieved when the method is utilized.

However, when progressive build-up is used in combination with conventional sequential build-up, a transmission scheme or dual-purpose apparatus that allows both functions is necessary. Such a system is very complicated. Accordingly, pseudo-sequential build-up has been contemplated in which use is made of image data created by progressive build-up.

FIG. 6 is a diagram useful in describing progressive build-up and pseudo-sequential build-up.

Pseudo-sequential build-up is a method in which n-number of stripes obtained by subdividing the image of an original shown in (a) of FIG. 6 are transmitted in the sequence indicated at 801 in (b) of FIG. 6. At the start, a first stripe is transmitted at 400 dpi, then the second stripe is transmitted at 400 dpi, and finally the n-th stripe is transmitted at 400 dpi.

In progressive build-up, n-number of stripes are transmitted in the sequence indicated at 802 in (b) of FIG. 6. The first through n-th stripes are transmitted at 12.5 dpi, then the first through n-th stripes are transmitted at 25 dpi, and finally the first through nth stripes are transmitted at 400 dpi. As a result, a full, rough image is transmitted at an early stage, after which the quality of the image gradually improves.

However, certain problems are encountered in the prior art described above. Specifically, in the transmission of an image by a conventional facsimile machine, no particular criteria are provided for deciding whether progressive, pseudo-sequential or sequential build-up is to be used when the image data is coded and transmitted. Consequently, if the image is transmitted by progressive build-up and the printer on the receiving side is a line printer, the image cannot be outputted unless the reception of all image data ends. This means that the facsimile machine is occupied for a longer period of time, as a result of which the machine cannot be used efficiently.

Further, if the width of transmitted stripes is fixed when the image data is transmitted, then, even if the recording width of the recording element of the facsimile machine on the receiving side is larger than the transmitted stripe width, the image information transmitted in units of the narrow stripes cannot start being recorded until after color image information in an amount equivalent to the recording width of the recording element has accumulated on the receiving side. As a result, reception cannot be carried out efficiently.

Conversely, in a case where the recording width is smaller than the width of a transmitted stripe, it is necessary to provide the receiving side with additional hardware such as a buffer whose storage width is greater than the recording width.

More specifically, in a case where stripe width L1 and recording width L2 do not coincide, a memory for storing image data whose width is a whole-number multiple of the stripe width L1 must be provided on the receiving side even if L1 and L2 are not whole-number multiples. The result is a more complicated arrangement.

The above-mentioned problems relating to the efficiency of image transmission become even more pronounced when multiple-address transmission is performed. These problems must be solved to prepare for the future appearance of a facsimile machine capable of progressive coding and multiple-address transmission.

Another problem with the prior art described above is that a line is occupied for a long period of time if communication speed is low (less than 4,800 bps). Accordingly, when a transmission is made by sequential build-up or pseudo-sequential build-up, there is a high possibility that not all of the image data will be transmitted to the receiving machine if communication is interrupted as by a broken line.

Further, if the memory capacity of the machine on the receiving side is small, there are instances where the memory overflows when a transmission is made by progressive build-up. A normal transmission cannot be performed at such time.

SUMMARY OF THE INVENTION

An object of the invention is to solve the aforementioned problems and provide an image transmission method and apparatus whereby coded image data is transmitted in an efficient manner.

Another object of the invention is to provide an image transmission method and apparatus whereby progressively coded image data can be transmitted in an efficient manner.

A further object of the invention is to provide an image transmission method and apparatus in which progressive coding is possible and multiple-address transmission can be performed, and in which image data can be transmitted in accordance with progressive build-up or pseudo-sequential build-up designated on the receiving side, whereby multiple-address transmission can be performed efficiently.

According to one aspect of the present invention, the foregoing objects can be attained by determining, based upon information sent from a receiving side at the time of negotiation, whether an apparatus on the receiving side is capable of progressive build-up, pseudo-sequential build-up, sequential build-up alone or both progressive build-up and sequential build-up, whereby efficient transmission of an image can be performed.

Examples of the information sent from the receiving side include an instruction entered on the receiving side, the type of printer, the stripe width if the printer is capable of stripe printing, the communication speed and the memory capacity, etc. It is possible to use information from a line or network as well.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram for describing the header of progressive coding in an NSF DIS signal transmitted by a facsimile machine on the receiving side;

FIG. 5 is a diagram showing an example of the format of facsimile information in this embodiment;

FIG. 6 is a diagram for describing a build-up method of progressive coding;

DESCRIPTION OF THE PREFERRED EMBODIMENTS

Preferred embodiments of the present invention will now be described in detail with reference to the drawings.

Figure 1:
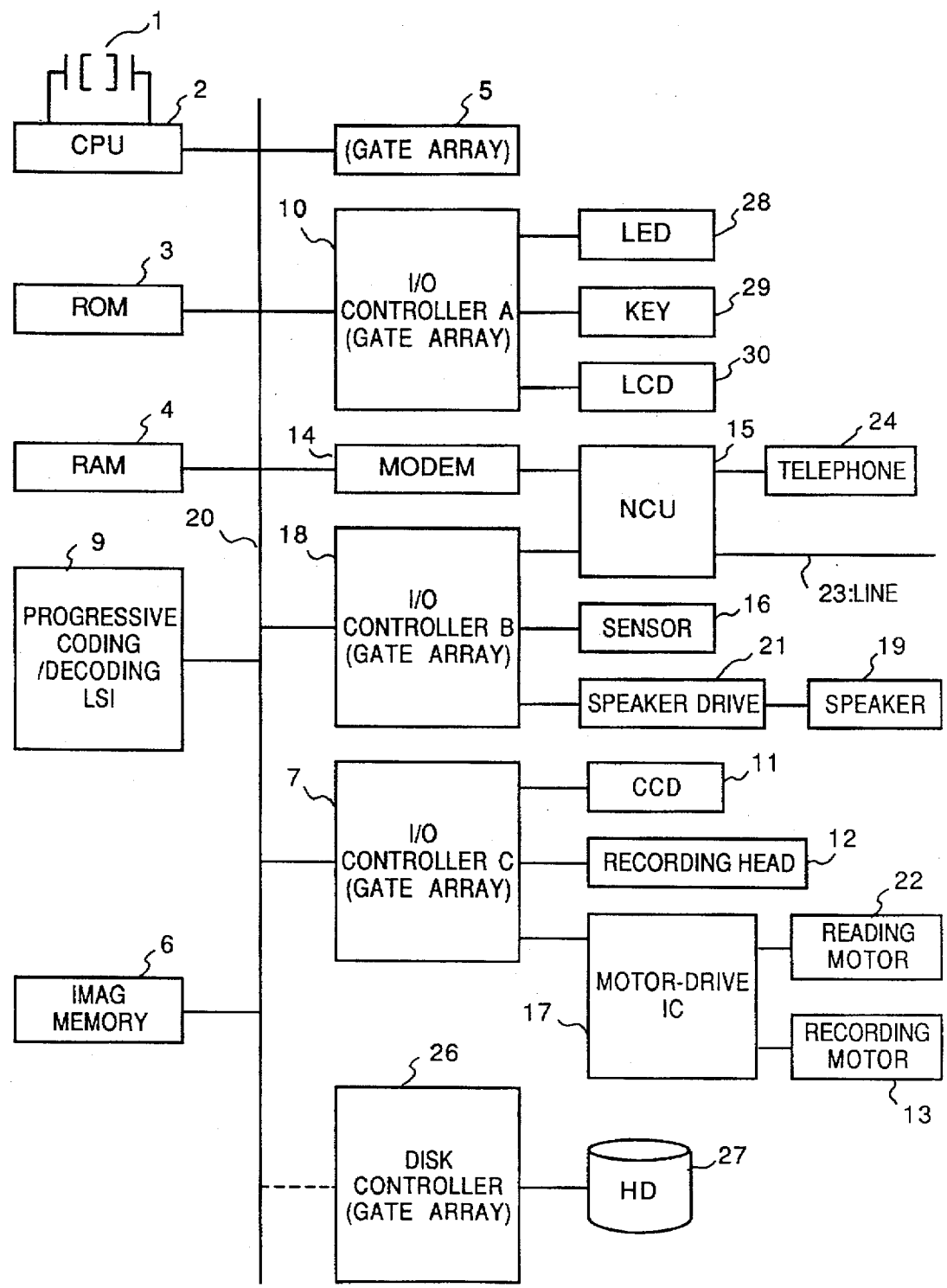
FIG. 1 is a block diagram illustrating the configuration of a facsimile machine, which is an image transmission apparatus according to the present invention.

FIG. 1 is a block diagram showing the configuration of a facsimile machine, which embodies an image transmission apparatus according to the present invention.

As shown in FIG. 1, the facsimile machine includes a CPU 2, which is connected to a ROM 3 and a RAM 4 via a bus 20, for controlling the operation of the overall apparatus in accordance with a control program that has been stored in the ROM 3. The RAM 4 is used as the work area of the CPU 2. The latter has a quartz oscillator for generating an operating clock. Blocks 7, 10, 18 and 26 illustrated as gate arrays are I/O controllers (inclusive of a disk controller) for controlling input/output units.

The facsimile machine has a reading unit, which is for reading the image of an original, mainly comprising a CCD line sensor 11 and a reader motor 22. An image recording unit, which includes a recording head (thermal head) 12 and a recording motor 13, is used for recording a received image or for coping an image. The reader motor 22 and the recording motor 13 are driven by a motor-drive IC 17.

A motor 14 modulates and demodulates image data and control-procedure data and is connected to a line 23 via an NCU 15. The NCU 15 holds the loop current of the line 23 and performs a line exchange with a telephone 24. An LSI 9 performs progressive coding and decoding. To this end, the LSI 9 executes processing ("C", which is coding processing, and "D", which is decoding processing, shown in FIG. 2), described later. An image memory 6 stores image data that is transmitted and received. As will be described below, the memory 6 may be replaced by a large-capacity hard disk 27.

Figure 2:
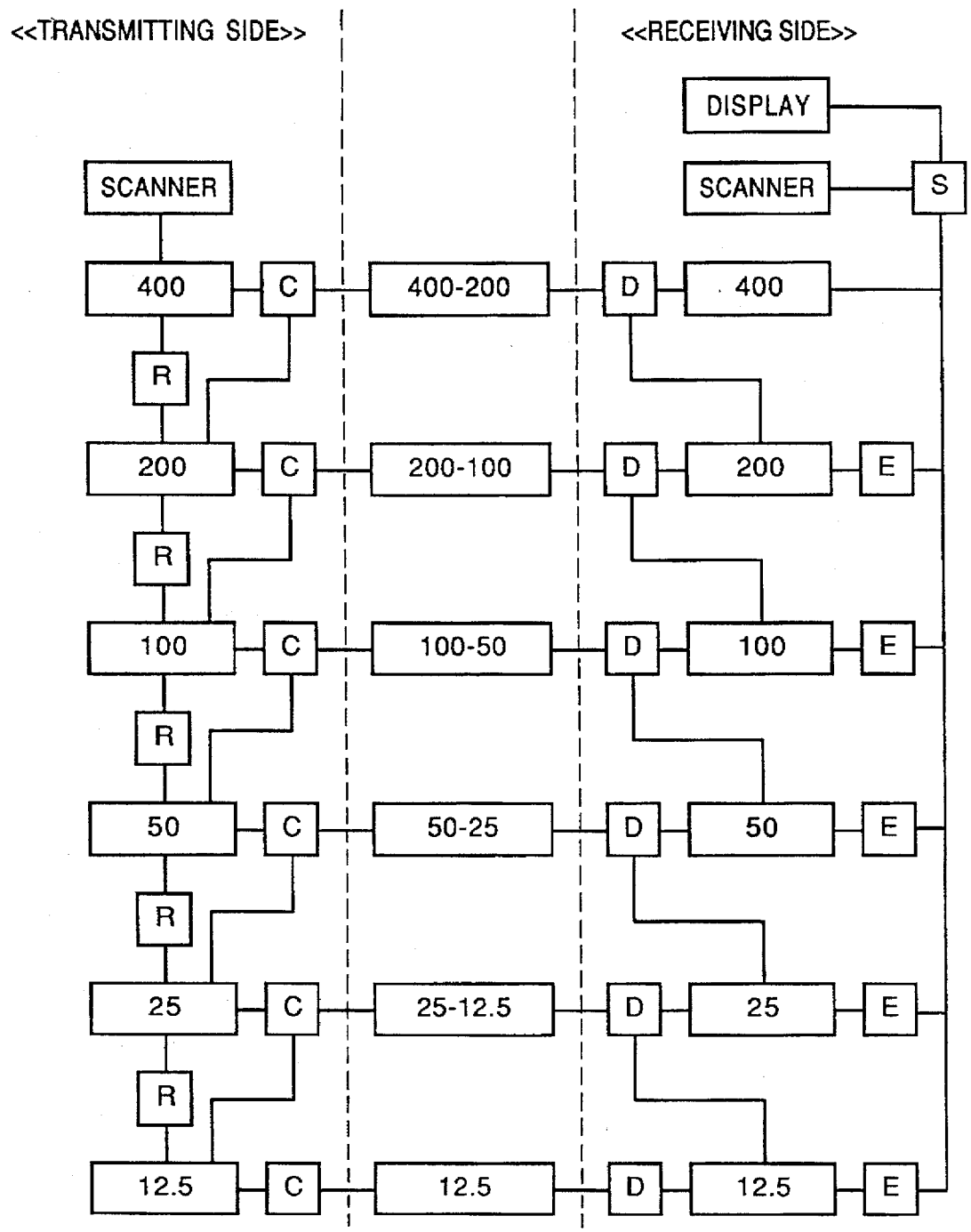
FIG. 2 is a diagram showing the concept of progressive coding processing, which is the object of standardization by the JBIG.

FIG. 2 is a diagram showing the concept of progressive coding processing, which is the object of standardization by the JBIG (Joint Bi-level Image Group). Here the resolution of the original image is assumed to be 400 dpi or more. On the transmitting side, a low-resolution image, which is the result of halving the resolution in both the horizontal and vertical directions, is created successively in the required number of layers on the transmitting side.

In the model of standardization shown in FIG. 2, the resolution of the original image is 400 dpi, the number of layers is six and the minimum resolution is 12.5 dpi. Images of resolutions 12.5 dpi and 25 dpi are displayed in a size of $\frac{3}{16} \times \frac{3}{16}$ of the original image and are assumed to be utilized as icons.

On the transmitting side, first the image of the minimum resolution is coded and transmitted. Next, information needed to successively improve raise resolution is coded. On the receiving side, the image is decoded and reproduced from the image of the minimum resolution, and an image of successively greater resolution is displayed, whereby a progressive display is realized. Eventually, coding and reproduction of the original image having little deterioration in quality are obtained. However, it is possible to discontinue this process at an image of intermediate resolution when necessary.

The circuits on the left and right sides of FIG. 2 are constructed within the progressive coding/decoding LSI 9. In FIG. 2, R represents a reducing circuit for halving resolution, C a coding unit for arithmetically coding information indicative of a difference in image data, D a decoding unit, E an enlarging circuit for enlarging image data that has been reduced and S a selector for selecting an output.

The details of control in the facsimile machine of this embodiment will now be described.

Figure 3:
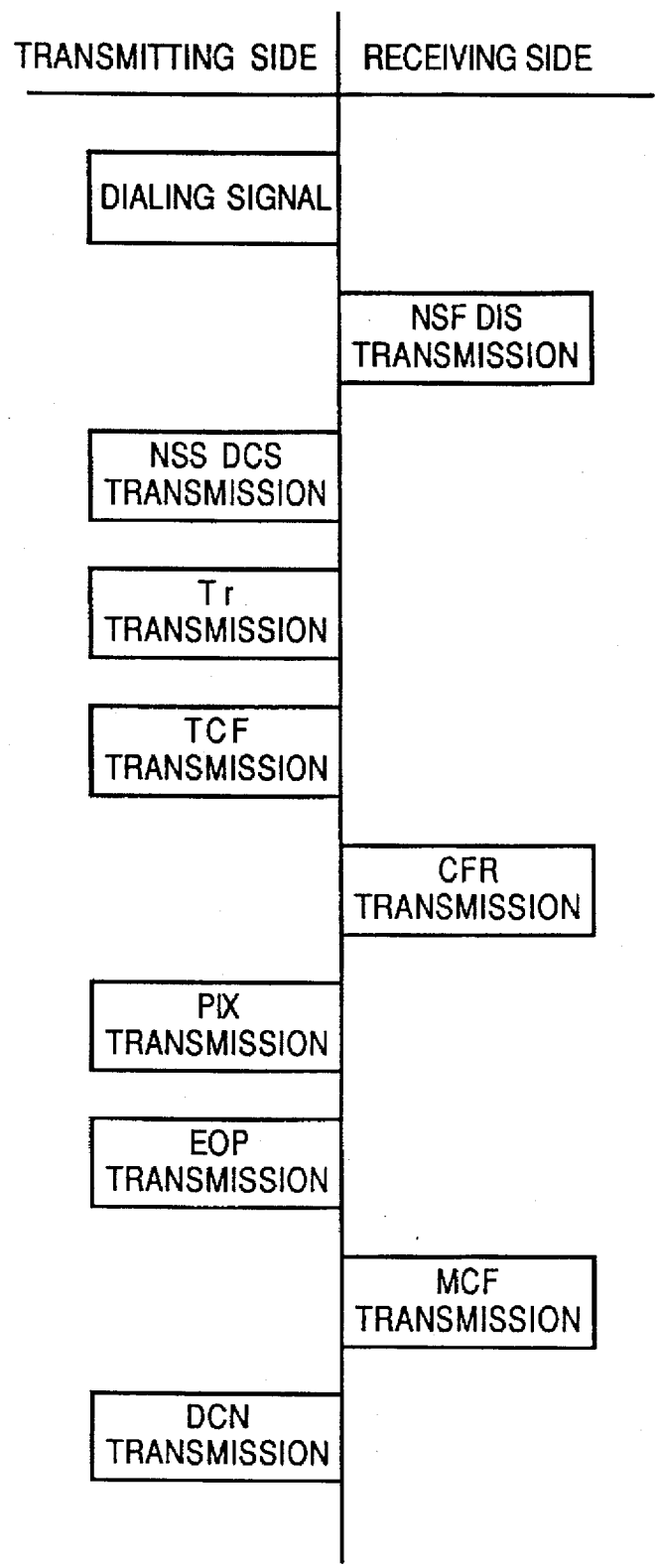
FIG. 3 is a diagram showing the overall communication procedure of a facsimile machine according to this embodiment.
Figure 7:
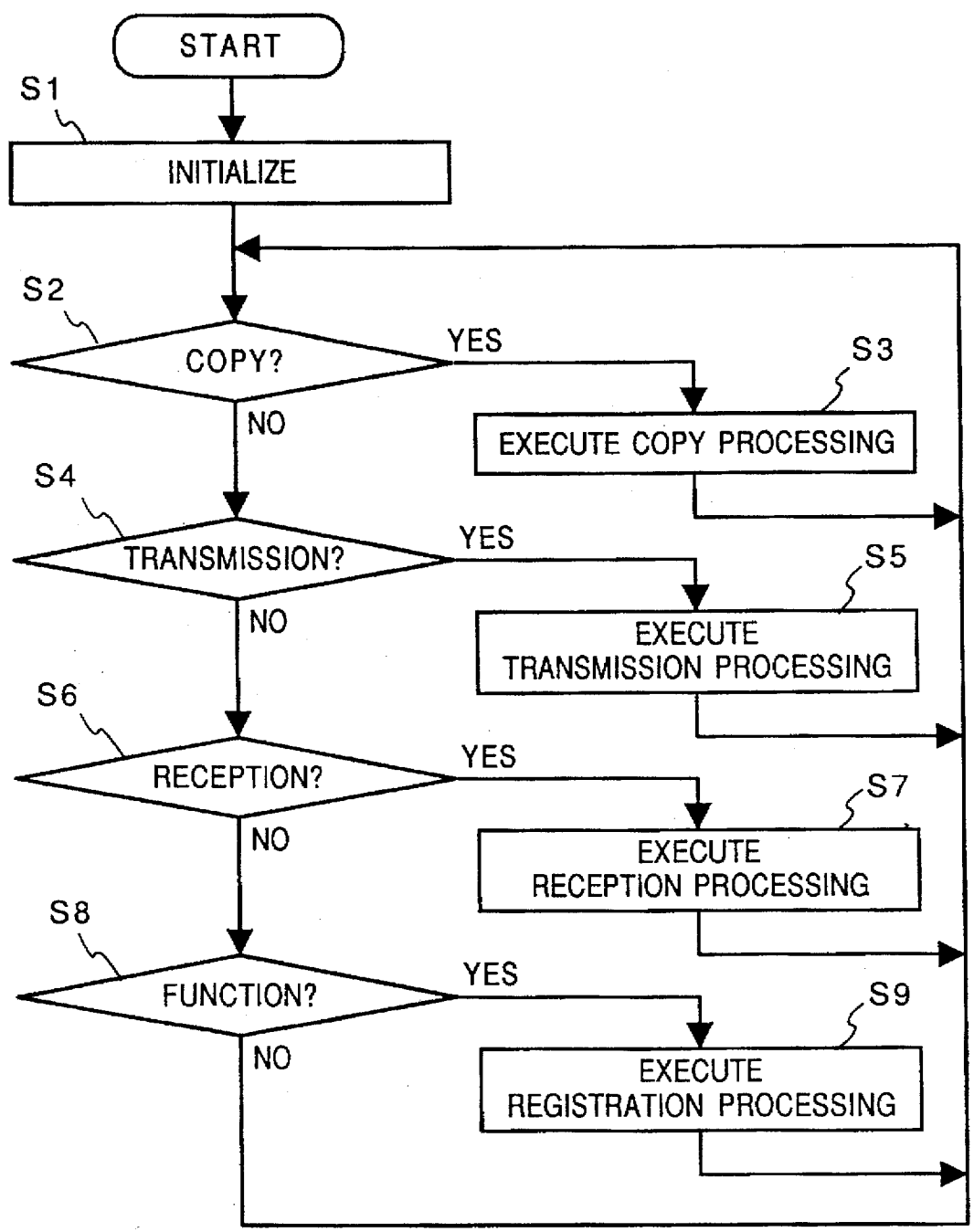
FIG. 7 is a flowchart showing a communication control procedure in the facsimile machine according to this embodiment.

FIG. 3 is a diagram illustrating the overall communication procedure of the facsimile machine according to this embodiment, and FIG. 7 is a flowchart illustrating the communication control procedure of the facsimile machine according to this embodiment. In FIG. 3, the header of progressive coding and the facsimile information from the receiving side are transmitted together with "NSF DIS".

Reference will be had to FIG. 5 to describe the header of progressive coding in this embodiment.

In FIG. 4, DL represents an initial layer to be progressively coded and transmitted, D the number of layers other than that of the initial resolution to be transmitted as a progressive code, P the number of bit layers, Xd the number of pixels, expressed using four bytes, in the horizontal direction, Yd the number of pixels, expressed using four bytes, in the vertical direction, Lo the number of lines constituting a stripe in a start layer, namely the initial layer to be transmitted, Mx the maximum distance, in the horizontal direction, of a template used at the time of coding, and My the maximum distance, in the vertical direction, of a template used at the time of coding.

Further, HITOLO is a bit indicating whether transmission is to be made from high-resolution data or low-resolution data when progressive transmission is carried out, SEQ is a bit indicating whether a sequential transmission is to be made, and ILEAVE is a bit indicating whether the data of multiple bit planes is to be interleaved.

FIG. 5 illustrates an example of the format of facsimile information.

In FIG. 7, the CPU 2 initializes parameters at step S1 when the power supply of the facsimile machine is turned on. It is determined at steps S2, S4, S6, S8 whether the operating mode is the copy mode, transmission mode or reception mode, or whether a function has been selected, respectively. Based upon the results of these decisions, copy processing, transmission processing, reception processing or function processing is executed. For example, when the CPU 2 detects via the gate array 10 that an original has been placed in the facsimile machine and that a key 29 (FIG. 1) has been pressed, the program proceeds from step S4 to transmission processing at step S5.

The transmission procedure of the invention will now be described.

Figure 8:
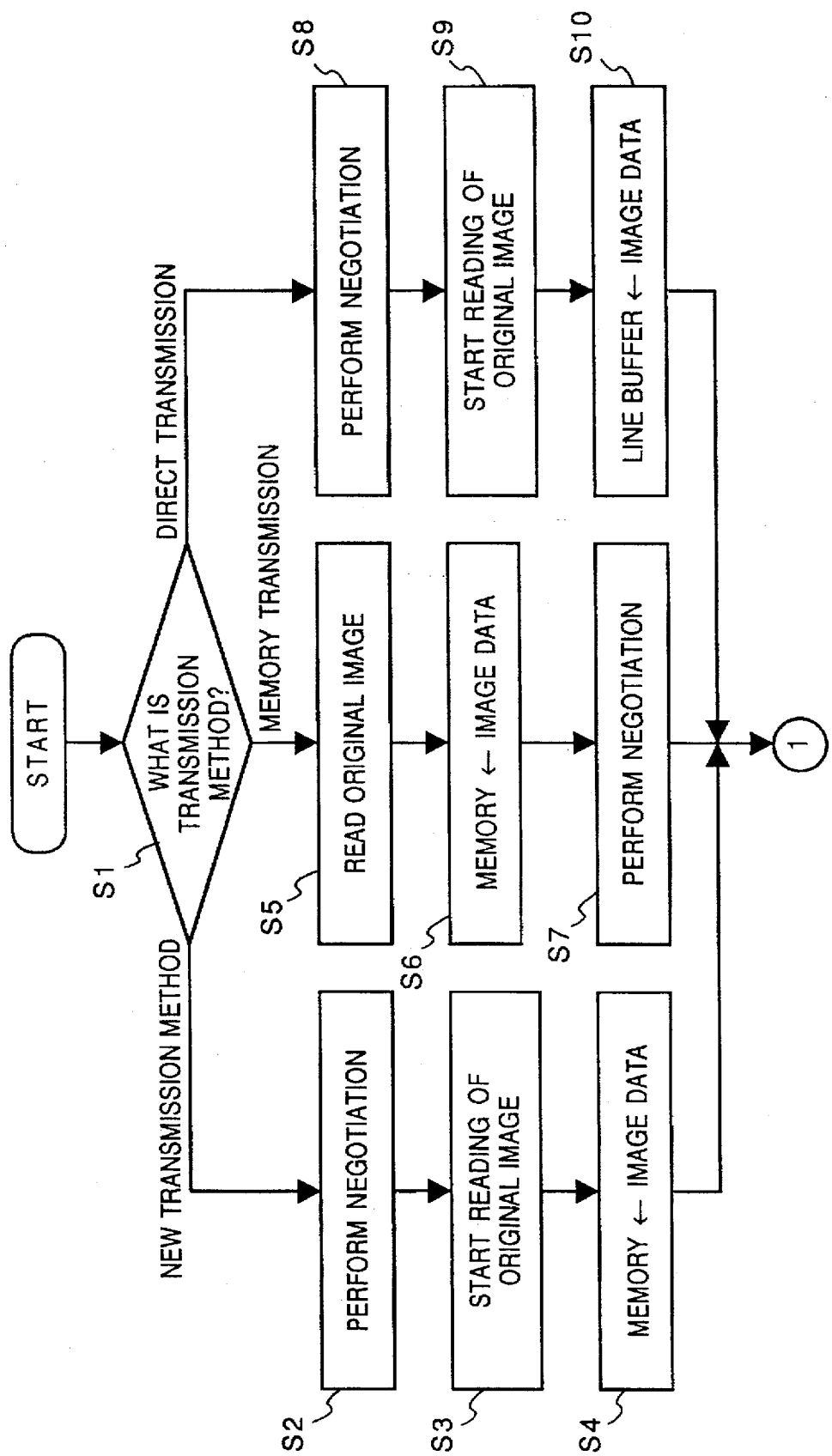
FIG. 8 is a flowchart illustrating an example of a transmission procedure according to the embodiment.
Figure 9:
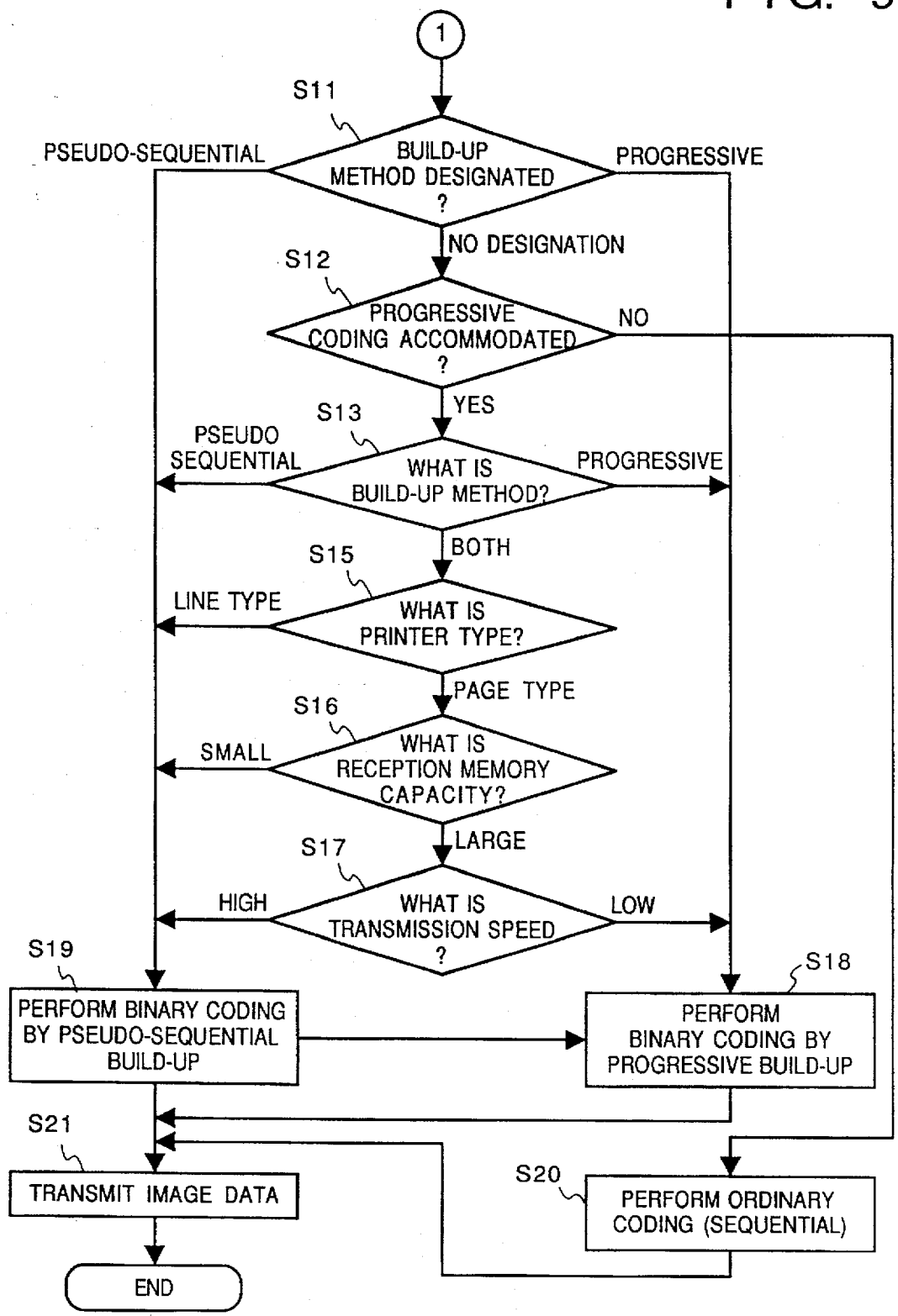
FIG. 9 is a flowchart illustrating an example of a transmission procedure according to the embodiment.

FIGS. 8 and 9 are flowcharts illustrating an example of a transmission procedure according to the embodiment.

When a transition to the transmitting operation is made in this embodiment, the transmission method that has been set is determined at step S1. The program proceeds to step S2 in case of a new transmission method, described below, to step S5 in case of memory transmission, and to step S8 in case of direct transmission. The new transmission method mentioned above is a method in which a scanner is operated at the end of negotiation, whereby image data is transmitted while it is being stored in the memory 6.

If the new transmission method has been set, in this embodiment negotiation with the receiving machine is performed at step S2, after which the image scanner is caused to start reading the original image at step S3. This is followed by step S4, at which the image data outputted by the image scanner is stored in the memory 6. The program then proceeds to step S11.

If memory transmission has been set, in this embodiment the image scanner is caused to start reading the original image at step S5 and then the image data outputted by the image scanner is stored in the memory 6 at step S6. Negotiation is then performed with the receiving machine at step S7, after which the program proceeds to step S11.

If direct transmission has been set, in this embodiment negotiation is performed with the receiving machine at step S8, after which the image scanner is caused to start reading the original image at step S9. One line of image data outputted by the image scanner is stored in a line buffer at step S10, and the program then proceeds to step S11. It should be noted that the CPU 2 sets the line buffer in the memory 6 or buffer (gate array) 5. Here the progressive coding header and the facsimile information are transmitted in the negotiation processing.

Next, the designated build-up method is discriminated at step S11 according to this embodiment. The program proceeds to step S19 in a case where pseudo-sequential build-up has been designated by the facsimile machine on the receiving side, to step S18 in a case where progressive build-up has been designated on the receiving side, and to step S11 if no designation has been made on the receiving side.

If no designation has been made, in this embodiment it is determined at step S12 whether the machine on the receiving side is capable of accommodating progressive coding. The program proceeds from step S12 to step S13 if the answer is "YES" and to step S20 if the answer is "NO". At step S20, the image data that has been stored in the memory 6 is coded by an ordinary coding method (MH, MR, MMR, etc.) (circuitry and processing for ordinary coding are not illustrated).

If the receiving machine is capable of accommodating progressive coding, the build-up method of the progressive coding of the receiving machine is discriminated at step S13. The program proceeds from step S13 to step S18 if only progressive build-up can be accommodated, to step S19 if only pseudo-sequential build-up can be accommodated, and to step S15 if both types of build-up can be accommodated (Compatible Progressive Sequential).

According to this embodiment, the type of printer on the side of the receiving facsimile machine is discriminated at step S15. If the printer is a line printer, then the program proceeds from step S15 to step S19. In the case of a page printer, or if the device is other than a printer (e.g., a display unit or the like), the program proceeds from step S15 to step S16.

In this embodiment, the capacity of the reception memory in the receiving machine is discriminated at step S16. If the memory capacity is found to be small, progressive build-up is deemed to be impossible and the program proceeds from step S16 to step S19. If the memory capacity is found to be large, progressive build-up is deemed to be possible and the program proceeds from step S16 to step S17.

In this embodiment, communication speed, which is decided by the aforesaid negotiation, is discriminated. If the communication speed is high (e.g., more than 9,600 bps in the G3 mode), the entire image is transmitted immediately and therefore the program proceeds to step S19. If the communication speed is low (e.g., less than 4,800 bps in the G3 mode), the program proceeds to step S18 in order avoid interruption of transmission before the entire image is sent.

In this embodiment, the image data that has been stored in the memory 6 or the like is coded by progressive build-up by the progressive coding/decoding LSI 9 at step S18. At step S19, on the other hand, image data that has been stored in the memory 6 is coded by pseudo-sequential build-up by the progressive coding/decoding LSI 9 or coding unit. The program proceeds to step S21 from steps S18, S19.

Next, at step S21 according to this embodiment, the transmission of the coded image data is started by the NCU 15. The transmission procedure is terminated following the transmission of the entire original image.

In accordance with this embodiment, as described above, coding is performed upon selecting the build-up method in conformity with the type of printer on the receiving side if the build-up method is not designated by the facsimile machine on the receiving side. Accordingly, if the printer of the receiving facsimile machine is a line printer, coding this embodiment is performed by pseudo-sequential build-up. As a result, the receiving facsimile machine is capable of outputting the received image while the image data is being received. This means that the time the facsimile machine is occupied is shortened so that the machine can be used in an effective manner.

Further, in accordance with this embodiment, coding is performed upon selecting the build-up method in dependence upon communication speed in a case where the build-up method has not been designated on the side of the receiving machine. Accordingly, if the communication speed is low, coding is performed using progressive build-up. Consequently, even if communication is interrupted as by line breakage, it is possible to diminish the possibility that all of the image data will not be transmitted to the receiving facsimile machine.

The transmission procedure in a facsimile machine having a hard disk will be described next.

In FIG. 1, numeral 27 denotes a hard disk (HD) for storing image data and the like. Numeral 26 denotes an HD controller for controlling the HD 27.

Figure 10:
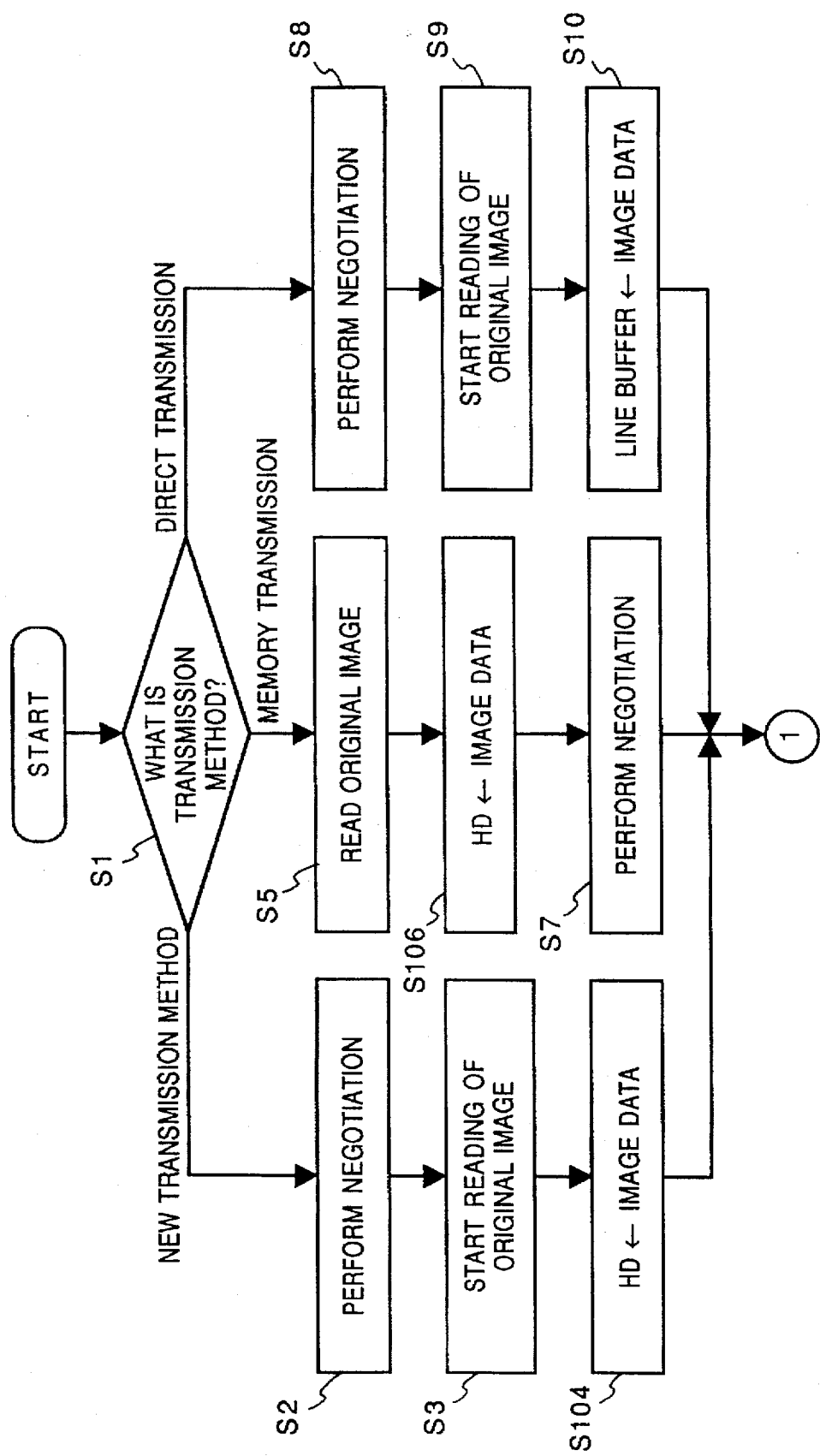
FIG. 10 is a flowchart illustrating another example of a transmission procedure according to the embodiment.

FIG. 10 is a flowchart illustrating the portion of the transmission procedure that corresponds to FIG. 8. Steps in the transmission procedure of FIG. 10 that correspond to those in FIG. 8 are designated by like step numbers and need not be described again in detail.

When a transition to the transmitting operation is made in this embodiment, the transmission method that has been set is determined at step S1. The program proceeds to step S2 in case of the new transmission method, described above, to step S5 in case of memory transmission, and to step S8 in case of direct transmission.

If the new transmission method has been set, in this embodiment negotiation with the receiving machine is performed at step S2, after which the image scanner is caused to start reading the original image at step S3. This is followed by step S104, at which the image data outputted by the image scanner is stored in the HD 27. The program then proceeds to step S11.

If memory transmission has been set, in this embodiment the image scanner is caused to start reading the original image at step S5 and then the image data outputted by the image scanner is stored in the HD 27 at step S106. Negotiation is then performed with the receiving machine at step S7, after which the program proceeds to step S11.

If direct transmission has been set, in this embodiment negotiation is performed with the receiving machine at step S8, after which the image scanner is caused to start reading the original image at step S9. One line of image data outputted by the image scanner is stored in a line buffer at step S10, and the program then proceeds to step S11. It should be noted that the CPU 2 sets the line buffer in the memory 6 or buffer (gate array) 5.

From this point onward, the image data is transmitted through a procedure substantially the same as that shown in FIG. 9. The transmission procedure is terminated following transmission of the entire original image.

In accordance with this embodiment, as described above, effects substantially the same as those of the embodiment illustrated in FIGS. 8, 9 are obtained. Moreover, since the image data is stored in the HD having a large capacity, it is possible to transmit a greater quantity of image data.

The facsimile machine on the receiving side will now be described in accordance with an embodiment of the invention.

Since the facsimile machine has a construction substantially the same as that of the embodiment shown in FIG. 1, the construction need not be described in detail again.

Figure 11A:
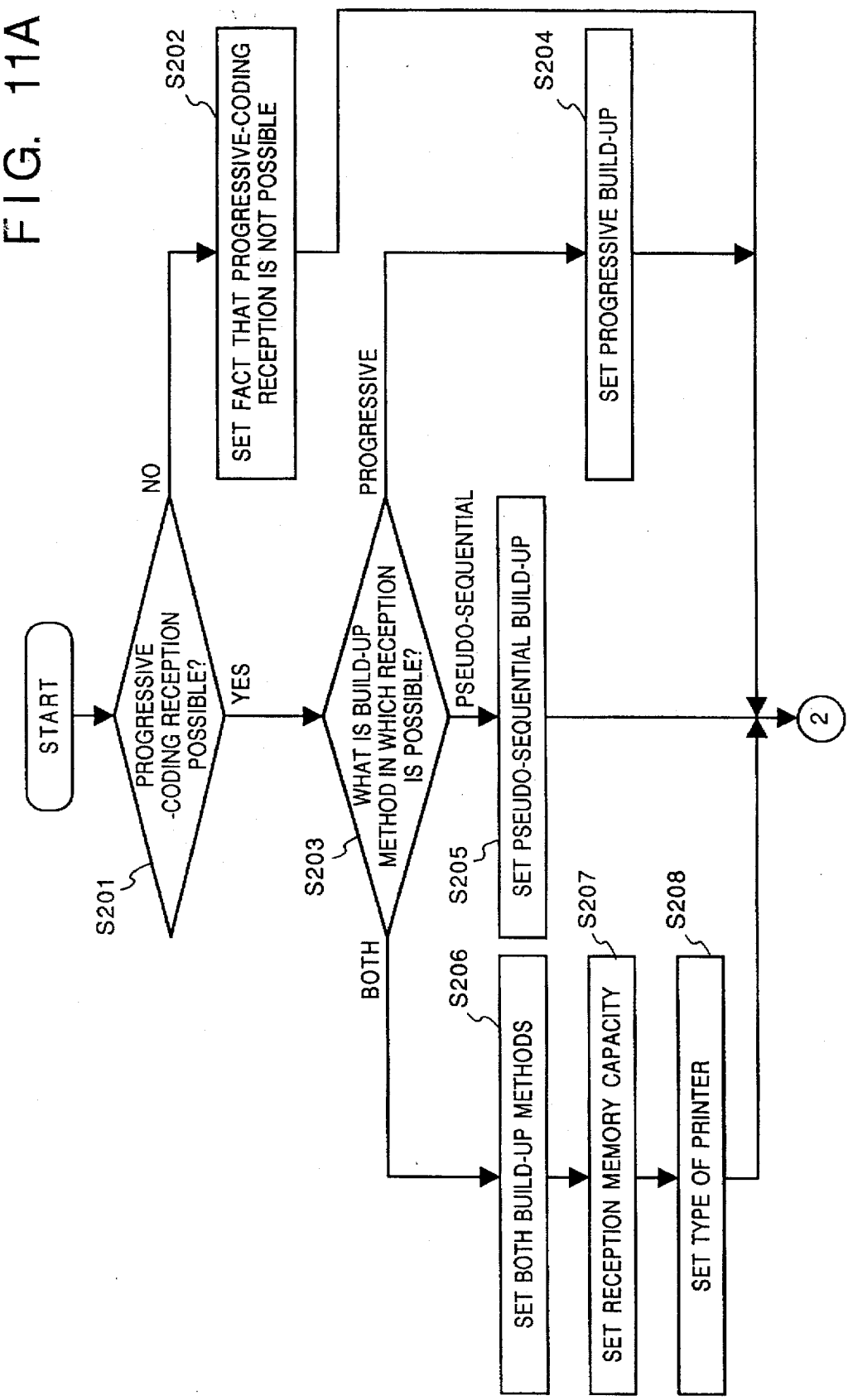
FIG. 11A, 11B are flowcharts showing a reception procedure.
Figure 11B:
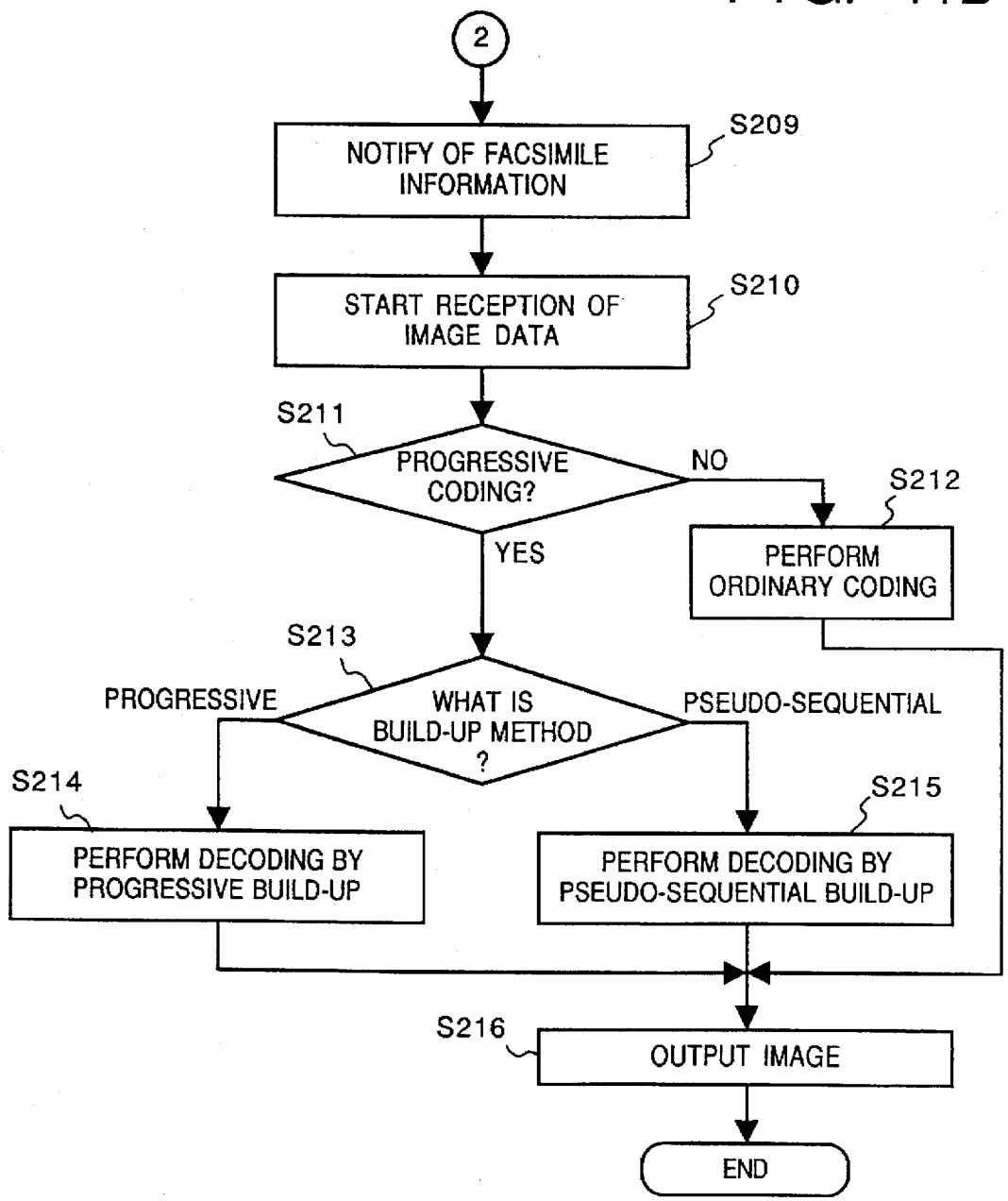

FIG. 11A, 11B are flowcharts showing an example of the reception procedure according to this embodiment.

In this embodiment, it is determined at step S201 whether reception of a progressive code is possible or not. The program proceeds to step S203 if reception is possible and to step S202 if it is not. The fact that reception of a progressive code is impossible is set in facsimile information at step S202, after which the program jumps to step S209. It should be noted that the facsimile information has a format of the kind shown in FIG. 5.

If a progressive code is capable of being received, in this embodiment the build-up method in which reception is possible is discriminated at step S203. If reception is possible with the progressive build-up method, the program proceeds to step S204. If reception is possible with the pseudo-sequential build-up method, the program proceeds to step S205. After the build-up method in which reception is possible has been set in the facsimile information at step S203 or S204, the program jumps to step 209. In this embodiment, the program proceeds to step S206 if reception is capable with both of the build-up methods.

If reception is capable with both of the build-up methods, this fact is set in the facsimile information at step S206. The reception memory capacity capable of being used is set in the facsimile information at step S207, and the type of printer is set in the facsimile information at step S208, after which the program proceeds to step S209.

Next, according to this embodiment, the transmitting facsimile machine is notified of the set facsimile information at step S209, after which reception of the image data is started at step S210.

This is followed by step S211, at which processing branches depending upon the coding method used to code the image data. In case of progressive coding, the program proceeds to step S213. If ordinary coding (MH, MR, MMR) is used, then the program proceeds to step S212, at which the image data is decoded by a decoding unit (not shown). The program then proceeds to step S216.

In case of progressive coding, processing branches at step S213 depending upon the build-up method. In case of progress build-up, the program proceeds to step S214, at which an image is built up progressively from the received data by the progressive coding/decoding LSI 9. In case of pseudo-sequential build-up, the program proceeds to step S215, at which an image is built up pseudo-sequentially from the received data by the progressive coding/decoding LSI 9. When each type of build-up ends, the program proceeds to step S216.

Next, at step S216, the image decoded at step S212 or the image built up at step S214 or S215 is outputted from the recording head 12 of the printer, after which processing is concluded.

In accordance with this embodiment, as described above, the transmitting facsimile apparatus can be instructed or notified of the coding method and build-up method in dependence upon the configuration and status of the facsimile machine. As a result, image data can be received through the optimum coding method and build-up method in conformity with the configuration and status of the facsimile machine.

In accordance with the present invention, it is possible to provide an image processing method for transmitting image information coded by a build-up method conforming to the type of image recording means on the side of the receiving machine, an image processing method for transmitting image information coded by a build-up method conforming to the reception memory capacity of the receiving machine, and an image processing method for transmitting image information coded by a build-up method conforming to the communication speed of the receiving machine.

In pseudo-sequential build-up described above, image data is transmitted in stripe units. There are also configurations in which image data is recorded in stripe units on the printer side as well.

Figure 12:
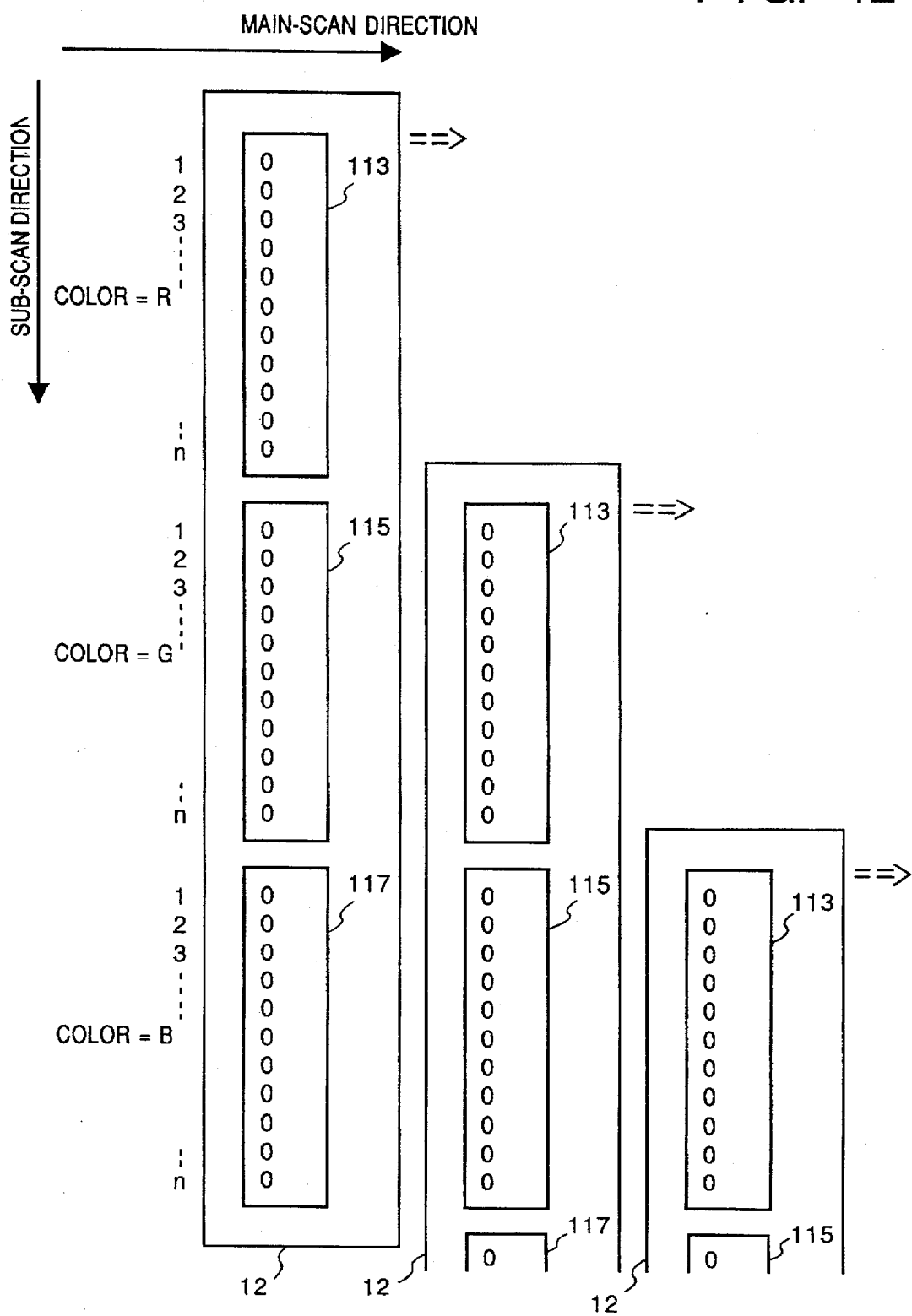
FIG. 12 is a diagram for describing a color recording unit in this embodiment.

The operation of a color recording unit that performs stripe recording will be described with reference to FIG. 12. Three recording heads 113, 115, 117, each having a plurality (n-number) of recording elements, for the three primary colors R, G, B (or C, Y, M) are mounted on the recording head unit 12. Each recording head prints n main-scan lines in the corresponding color, then the recording motor 13 is driven to advance the recording paper n lines vertically (in the sub-scan direction), and then the recording head unit is caused to scan again in the main-scan direction. By repeating this procedure, printing is performed by superimposing colors one color at a time so that a color image is printed. In this embodiment, n-number of elements are required as the recording elements of each recording head. Accordingly, the collective printing of n lines cannot start unless the reception/decoding of n lines of the image signal has ended. In other words, the system must wait even if the reception/decoding of (n−1) lines has ended.

The stripe transmission operation of this embodiment will now be described with reference to FIG. 13, which is a flowchart according to the embodiment. This embodiment is characterized by a procedure for deciding stripe width when transmission stripe width, which is fixed in the prior art, is made variable in accordance with this embodiment. The program of this flowchart, described below, is executed in "NSF DIS TRANSMISSION" and "NSS DCS TRANSMISSION" in the communication procedure of FIG. 4.

Figure 13:
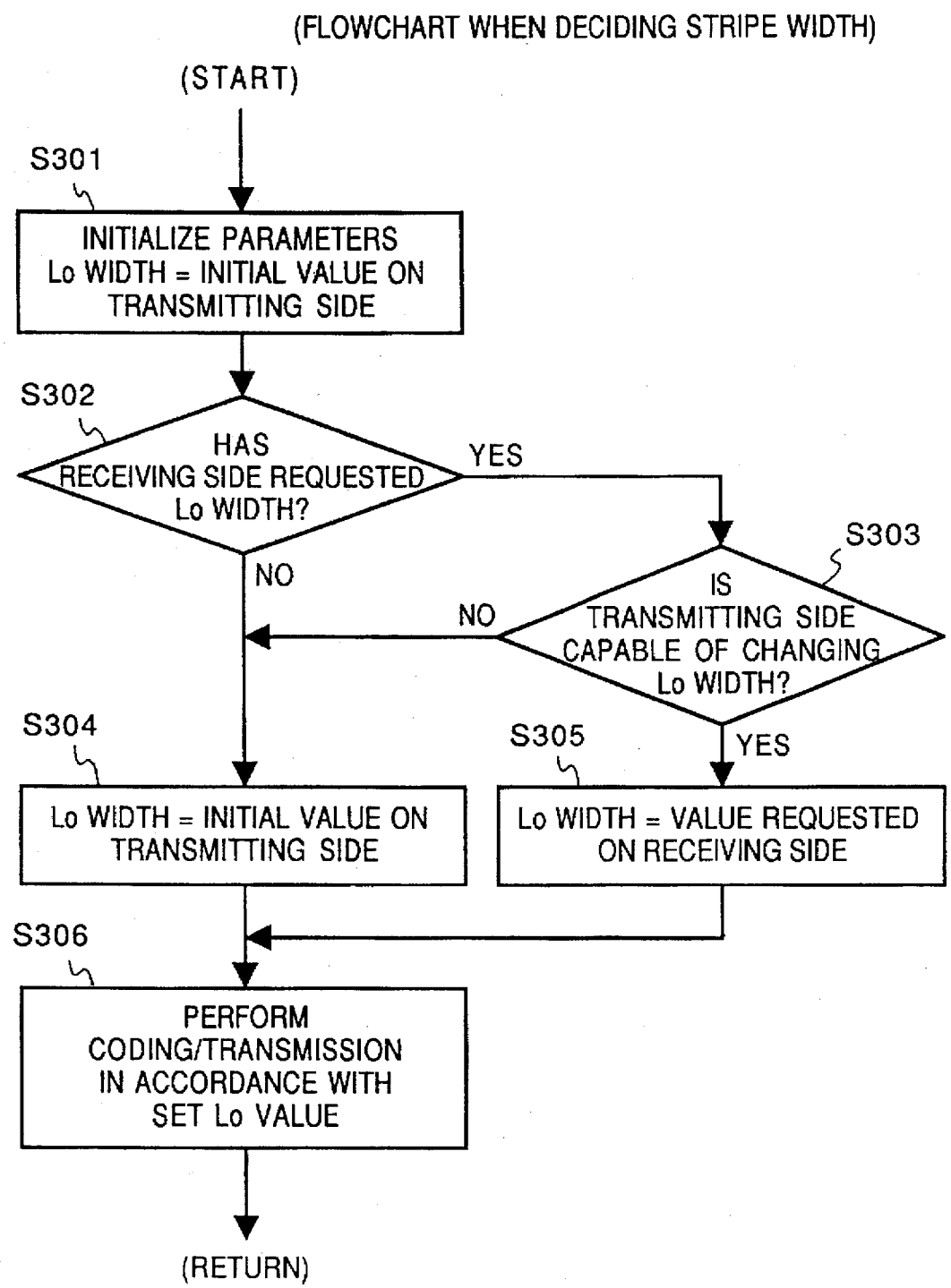
FIG. 13 is a flowchart showing an example of a transmission procedure that takes the color recording unit into account in this embodiment.

As shown in FIG. 13, parameters are initialized at step S301, at which time Lo width is set to be equal to the initial value (generally 8/25 inch) on the transmitting side. Next, at step S302, the CPU 2 determines whether the receiving side is requesting the Lo width, namely whether the receiving side also possesses the functions of the apparatus of this embodiment. The CPU 2 makes this determination based upon whether the receiving side has already inserted the header information of FIG. 4 in the signal of NSF DIS in the procedure of FIG. 3 and transmitted this information. If the decision rendered at step S302 is "YES", then the program proceeds to step S303, at which it is determined whether the transmitting side is capable of varying the Lo width. This determination is made based upon whether or not the user has set a software switch that inhibits this function. If the decision at step S303 is "YES", then the program proceeds to step S305, at which the Lo width is set to be equal to the value requested by the receiving side. The requested value on the receiving side is a "value of Lo in the header signal received from the machine on the receiving side", which value is used in the judgment criteria.

If the decision at step S302 or S303 is "NO", then the program proceeds to step S304, at which the Lo width is left equal to the initial value on the transmitting side. The program then proceeds to step S306. Here the image signal is coded and transmitted in accordance the value of the parameter of the Lo width set at step S305 or S304. In FIG. 3, "NSF DIS" represents non-standard function discrimination information, and "NSS DCS" information sent to inform the receiving side of the fact that a non-standard function has been set.

This embodiment will now be described with reference to FIG. 14, which is a flowchart illustrating a procedure performed when recording one page at the time of reception. In case of a plurality of pages, the flow of FIG. 14 is executed a number of times equal to the number of pages.

Figure 14:
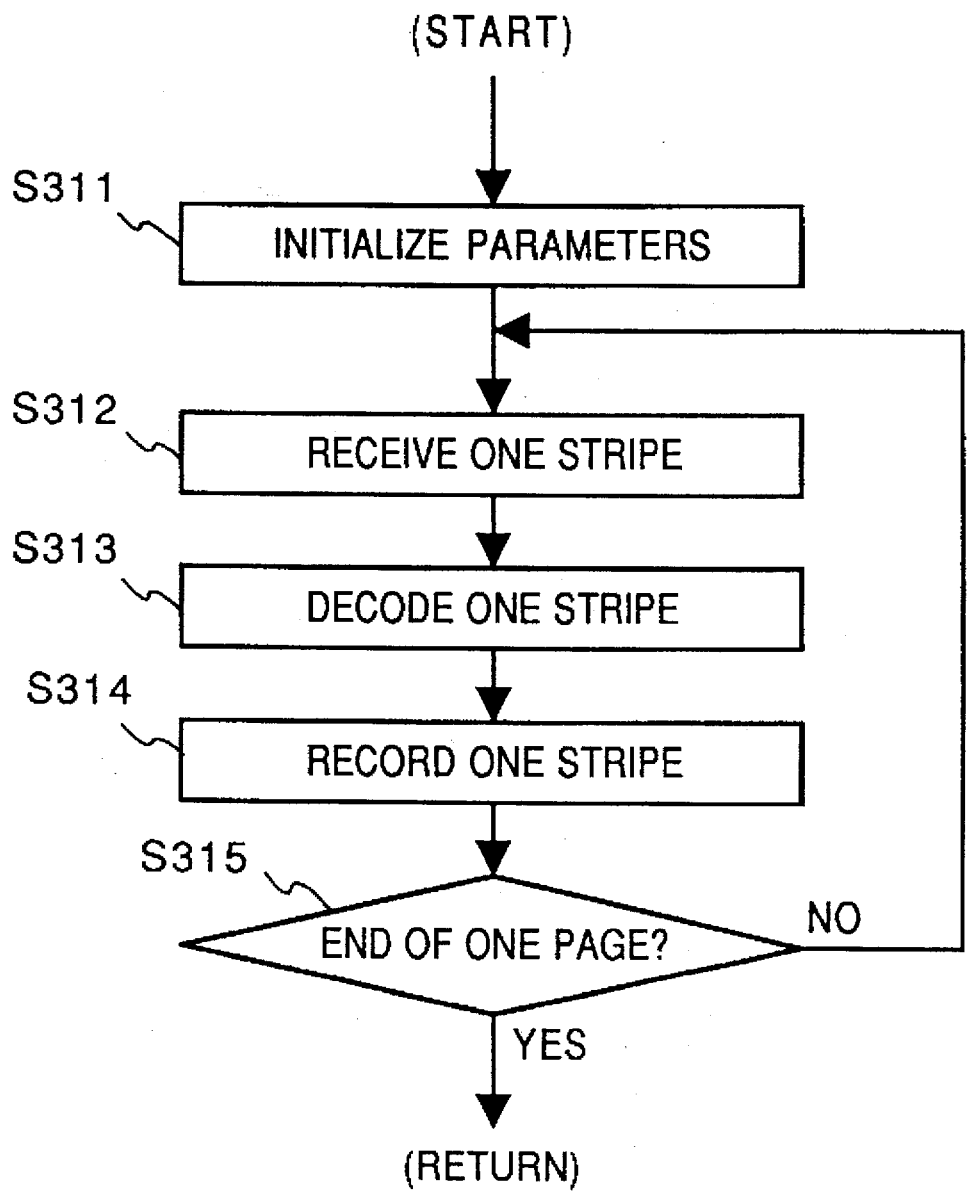
FIG. 14 is a flowchart showing an example of a transmission procedure that takes the color recording unit into account in this embodiment.

In FIG. 14, parameters are initialized at step S311. When reception of one stripe ends at step S312, the decoding of the stripe is performed at step S313. Since image data of one stripe is progressively coded stripe by stripe, decoding on the receiving side also is carried out at the moment all data from low to high resolution has been prepared as one stripe of image data. After the decoding of one stripe has been performed, the recording of one stripe is executed at step S314 [in this embodiment, Lo=n is beforehand through the processing of FIG. 13). The execution of loop comprising steps S312, S313, S314, S315, S312 is repeated until one page ends. At the conclusion of one page, a "YES" decision is rendered at step S315 and the program returns so that the procedure for the next page may be executed in a manner similar to that described above.

In order to progressively code image data in a width of one stripe, control may be executed by the CPU 2 or by the progressing coding/decoding LSI 9 in such a manner that image data corresponding to the Lo width decided by the execution of the flowchart of FIG. 13 will be read out of the image memory 6.

In accordance with this embodiment as described above, a facsimile system for transmitting/receiving color information is provided with a procedure in which the receiving side declares the recording stripe width of (R, G, B) and the transmitting side transmits an image in a stripe width that conforms to the color recording on the receiving side. As a result, the transmitting procedure is simplified and higher recording efficiency is realized on the receiving side.

This embodiment is not limited to a facsimile machine for color recording but is applicable to a monochromatic facsimile machine as well. Further, this embodiment can be applied to an image processing apparatus that does not possess an image reader.

In accordance with this embodiment, an efficient transmission can be carried out when image data is transmitted progressively block by block.

Described next will be an efficient transmission method in which the above-described method of transmission is expanded to multiple-address transmission.

Figure 15:
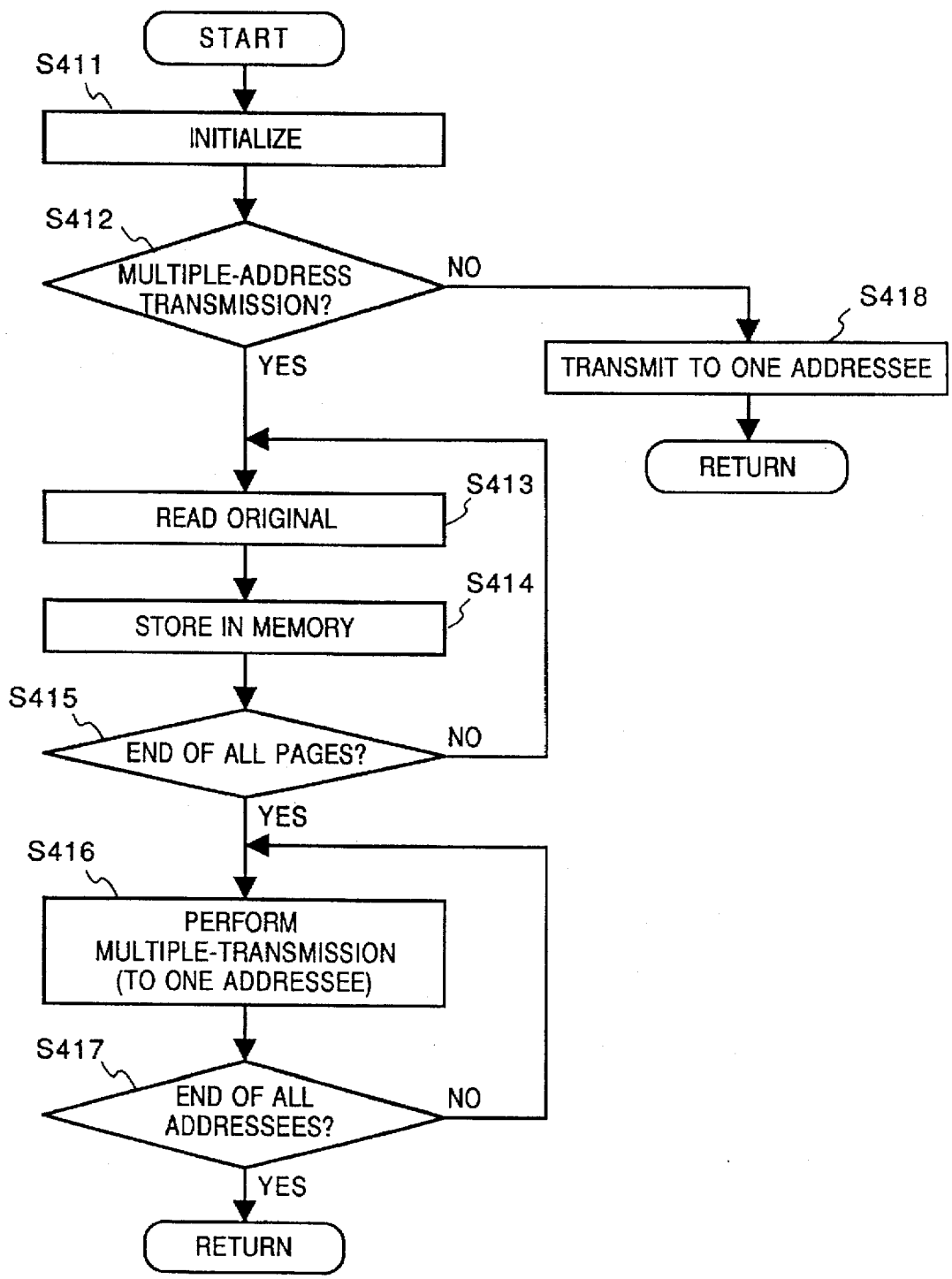
FIG. 15 is a detailed flowchart illustrating transmission processing that takes multiple-address transmission into account in this embodiment.

FIG. 15 is a detailed flowchart illustrating transmission processing that takes multiple-address transmission into account. As shown in FIG. 15, the CPU 2 initializes parameters at step S411 and then determines whether the transmission mode is for multiple-address transmission at step S412. More specifically, in a case where depression of a single-touch key (not shown) for designating multiple-address transmission has been detected, the result of the multiple-address transmission determination is "YES" and processing from step S413 onward is executed.

Specifically, the set original is read at step S413 and the image data indicative of the read original is stored in memory at step S414. If it is determined at step S415 that the reading and storage of all pages have been concluded, transmission processing is performed with regard to one addressee among a plurality thereof at step S416. The processing loop consisting of steps S416, S417, S416 is executed a number of times equal to the number of addressees involved in multiple-address transmission. The program returns when multiple-address transmission is concluded.

If it is found at step S412 that the mode is not the multiple-address transmission mode, the program proceeds to step S417, at which ordinary transmission processing is performed for transmission to a single addressee. The program returns following the conclusion of transmission processing.

The details of multiple-address transmission processing indicated at step S416 in FIG. 15 will now be described with reference to the flowchart of FIG. 16.

Figure 16:
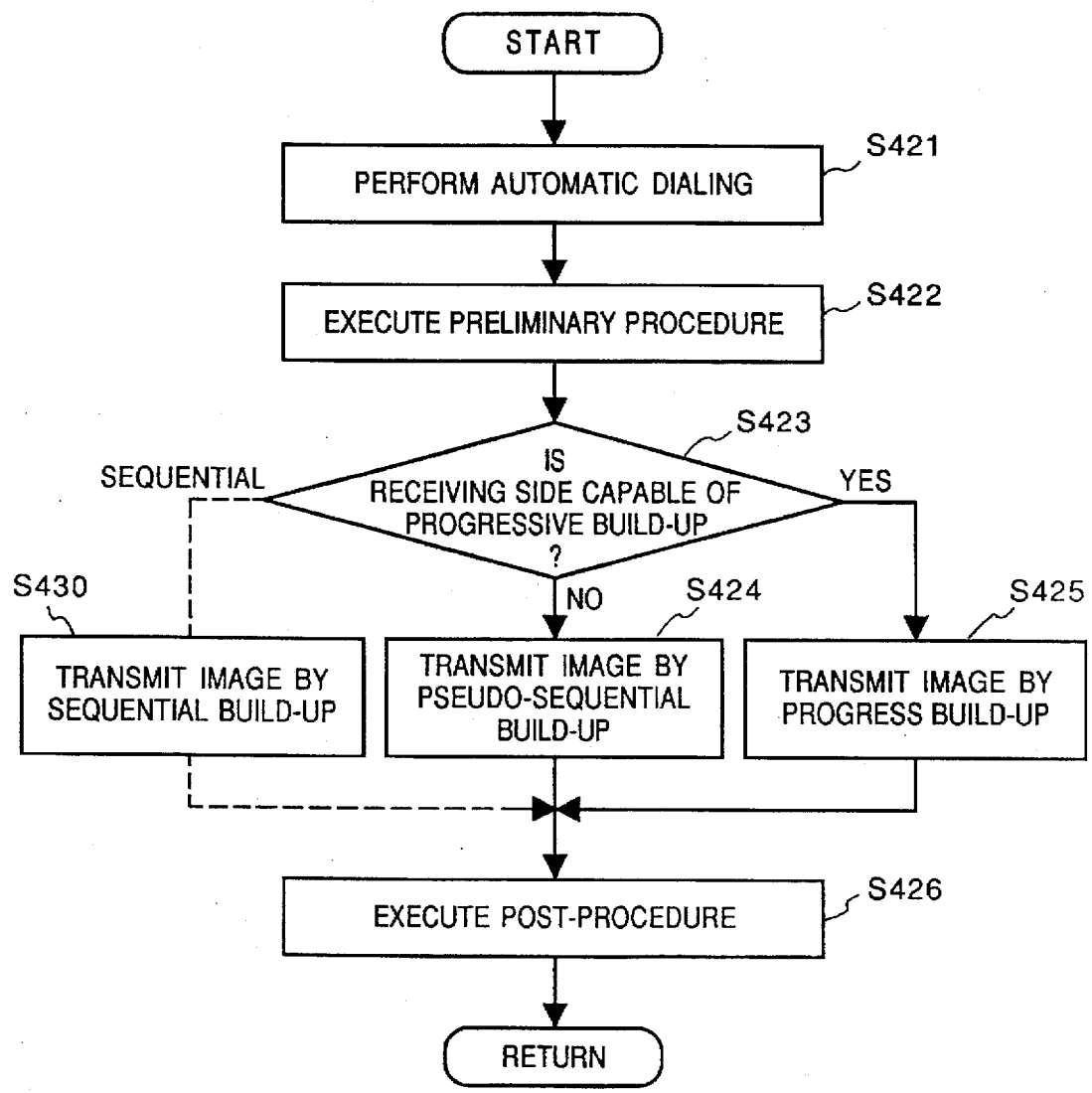
FIG. 16 is a detailed flowchart of multiple-address transmission processing shown in FIG. 15.

In FIG. 16, each addressee is dialed automatically at step S421 in order to perform multiple-address transmission, and a preliminary procedure is performed at step S422. This is followed by step S423, at which it is determined whether the facsimile machine on the receiving side is capable of progressive build-up. This determination is made based upon the bit information contained in the NSF signal in the communication procedure shown in FIG. 3, namely whether the SEQ bit in FIG. 4 is "0" or "1". It should be noted that FIG. 4 is a diagram illustrating the progressive coding header in the signal "NSF DIS" transmitted by the facsimile machine on the receiving side.

In a case where it is determined at step S423 that SEQ=0 holds, the program proceeds to step S425, at which transmission of image information coded in accordance with the progressive build-up method is performed. If SEQ=1 holds, on the other hand, transmission of image information coded in accordance with the sequential build-up method is performed. After transmission of the image, the program proceeds to step S426, where a post-procedure is executed. The program then returns.

The processing indicated by the flowchart of FIG. 16 is effectively repeated a number of times equivalent to the number of addressees involved in multiple-address transmission. Depending upon the facsimile machine on the receiving side, sequential build-up of step S424 or progressive build-up of step S415 is executed.

In accordance with this embodiment, as described above, progressive coding can be performed. In a facsimile apparatus capable of multiple-address transmission, image information is transmitted in accordance with progressive build-up or sequential build-up, whichever is designated by the machine on the receiving side. As a result, multiple-address transmission is made more efficient, and the man-machine interface of the apparatus can be improved.

Further, in accordance with the embodiment described above, multiple-address transmission of image data is performed in accordance with progressive build-up or sequential build-up, whichever is designated by the machine on the receiving side. As a result, multiple-address transmission is made more efficient, and the man-machine interface of the apparatus can be improved.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image transmission method comprising:
a first determination step of determining whether an apparatus on a receiving side is capable of progressive build-up;
a second determination step of determining whether the apparatus on the receiving side is suitable for the progressive build-up by detecting the type of printer on the receiving side; and
a transmission step of performing coding and transmission by a progressive build-up method if progressive build-up is determined to be possible at said first determination step and if the printer on the receiving side is determined to be a page printer at said second determination step.

2. The method according to claim 1, wherein a pseudo-sequential build-up method, which performs sequential build-up in stripe units, is selected if said printer is a line printer and the progressive build-up method is selected in case an image is to be formed on a device on the receiving side other than a printer.

3. The method according to claim 1, wherein the determination made at said second determination step is further based upon a memory capacity of the apparatus on the receiving side.

4. The method according to claim 3, wherein a pseudo-sequential build-up method, which performs sequential build-up in stripe units, is selected if said memory capacity is less than a predetermined capacity and the progressive build-up is selected if said memory capacity is greater than a predetermined capacity.

5. The method according to claim 3, further comprising a step of performing multiple-address transmission by repeating said first determination step, said second determination step and said transmission step.

6. The method according to claim 1, wherein the determination made at said second determination step is further based upon a communication speed.

7. The method according to claim 6, wherein the progressive build-up method is selected if communication speed is less than a predetermined speed and a pseudo-sequential build-up method, which performs sequential build-up in stripe units, is selected if communication speed is greater than a predetermined speed.

8. The method according to claim 1, further comprising:
a third determination step of determining a printing width of the printer on the receiving side; and
a step of setting a stripe width on a transmitting side in conformity with the determination made at said third determination step.

9. The method according to claim 8, further comprising a step of performing multiple-address transmission by repeating said first, second and third determination steps and said transmission step.

10. The method according to claim 1, further comprising a step of performing multiple-address transmission by repeating said first and second determination steps and said transmission step.

11. An image transmission method comprising:
a first determination step of determining whether an apparatus on a receiving side is capable of pseudo-sequential build-up;
a second determination step of determining whether the apparatus on the receiving side is suitable for the pseudo-sequential build-up by detecting the type of printer on the receiving side; and
a transmission step of performing coding and transmission by a pseudo-sequential build-up method if pseudo-sequential build-up is determined to be possible at said first determination step and if the printer on the receiving side is determined to be a line printer at said second determination step.

12. The method according to claim 11, wherein a pseudo-sequential build-up method, which performs sequential build-up in stripe units, is selected if said printer is a line printer and the progressive build-up method is selected in case an image is to be formed on a device on the receiving side other than a printer.

13. The method according to claim 11, further comprising a third determination step of determining memory capacity of the apparatus on the receiving side.

14. The method according to claim 13, wherein a pseudo-sequential build-up method, which performs sequential build-up in stripe units, is selected if said memory capacity is less than a predetermined capacity and the progressive build-up method is selected if said memory capacity is greater than a predetermined capacity.

15. The method according to claim 13, further comprising a step of performing multiple-address transmission by repeating said first determination step, said second determination step and said transmission step.

16. The method according to claim 11, wherein the determination made at said second determination step is further based upon a communication speed.

17. The method according to claim 16, wherein the progressive build-up method is selected if communication speed is less than a predetermined speed and a pseudo-sequential build-up method, which performs sequential build-up in stripe units, is selected if communication speed is greater than a predetermined speed.

18. The method according to claim 11, further comprising:

a third determination step of determining a printing width of the printer on the receiving side; and a step of setting a stripe width on a transmitting side in conformity with the determination made at said third determination step.

19. The method according to claim 18, further comprising a step of performing multiple-address transmission by repeating said first, second and third determination steps and said transmission step.

20. The method according to claim 11, further comprising a step of performing multiple-address transmission by repeating said first and second determination steps and said transmission step.

21. An image transmission method comprising:

a first determination step of determining whether an apparatus on a receiving side is capable of progressive build-up and;

a second determination step of determining whether the apparatus on the receiving side is suitable for the progressive build-up by detecting memory capacity; and a transmission step of performing coding and transmission by a progressive build-up method if progressive build-up is determined to be possible at said first determination step and if said memory capacity is less than a predetermined capacity at said second determination step.

22. An image transmission method comprising:

a first determination step of determining whether an apparatus on a receiving side is capable of progressive build-up and;

a second determination step of determining whether the apparatus on the receiving side is suitable for the progressive build-up by detecting communication speed; and a transmission step of performing coding and transmission by a progressive build-up method if progressive build-up is determined to be possible at said first determination step and if the communication speed is less than a predetermined speed.

* * * * *